(12) United States Patent
Steigert et al.

(10) Patent No.: US 9,772,038 B2
(45) Date of Patent: Sep. 26, 2017

(54) INTERMEDIATE PIECE FOR A STOP VALVE

(71) Applicant: GEMÜ Gebr. Müller Apparatebau GmbH & Co. Kommanditgesellschaft, Ingelfingen (DE)

(72) Inventors: Jochen Steigert, Lucerne (CH); Zeno Schuler, Sarmenstorf (CH)

(73) Assignee: GEMÜ Gebr. Müller Apparatebau GmbH & Co., Kommanditgesellschaft, Ingelfingen (DE)

( * ) Notice: Subject to any disclaimer, the term of this patent is extended or adjusted under 35 U.S.C. 154(b) by 34 days.

(21) Appl. No.: 14/726,784

(22) Filed: Jun. 1, 2015

(65) Prior Publication Data
US 2015/0377367 A1 Dec. 31, 2015

(30) Foreign Application Priority Data
Jun. 2, 2014 (DE) .......................... 10 2014 210 353

(51) Int. Cl.
*F16K 7/14* (2006.01)
*F16K 35/02* (2006.01)
(Continued)

(52) U.S. Cl.
CPC ................ *F16K 7/12* (2013.01); *F16K 7/126* (2013.01); *F16K 7/14* (2013.01); *F16K 27/0236* (2013.01); *F16K 35/02* (2013.01); *F16K 35/022* (2013.01)

(58) Field of Classification Search
CPC ... F16K 7/12; F16K 7/126; F16K 7/14; F16K 27/0236; F16K 35/02; F16K 35/022
(Continued)

(56) References Cited

U.S. PATENT DOCUMENTS 2,725,211 A * 11/1955 Boteler .................. F16K 7/126
251/331
2,853,270 A * 9/1958 Boteler .................. F16K 7/126
251/331
(Continued)

FOREIGN PATENT DOCUMENTS

DE          2119131 A1    10/1972
DE     102008035212 A1     2/2010
(Continued)

OTHER PUBLICATIONS

Examination Report issued on Mar. 5, 2015 in German Patent Application No. 10 2014 210 353.3.
(Continued)

*Primary Examiner* — Mary McManmon
*Assistant Examiner* — Richard K Durden
(74) *Attorney, Agent, or Firm* — Howard & Howard Attorneys PLLC

(57) ABSTRACT

An intermediate piece for a stop valve, in particular a membrane valve, for fluids including a pressure piece. The pressure piece has at least two locking slides for locking a locking member of a closure element. The intermediate piece includes a cylinder in which the pressure piece can be guided in axial manner. The intermediate piece has a recess, which is arranged in such a way that in mounting position of the pressure piece the locking slide can be shifted into the recess, thus releasing the locking member.

11 Claims, 6 Drawing Sheets

(51) Int. Cl.
*F16K 7/12* (2006.01)
*F16K 27/02* (2006.01)

(58) Field of Classification Search
USPC ......... 251/61–61.5, 77, 101, 331; 137/15.18, 137/315.27; 99/96, 98 R, 99, 101
See application file for complete search history.

(56) References Cited

U.S. PATENT DOCUMENTS

| | | | | |
|---|---|---|---|---|
| 3,075,740 | A | * | 1/1963 | McIntosh ................ F16K 7/126 251/331 |
| 3,409,037 | A | * | 11/1968 | Nelson ................ F16K 17/042 137/467 |
| 3,874,630 | A | * | 4/1975 | Novey ................ F16K 17/0453 251/297 |
| 4,328,950 | A | | 5/1982 | Aspinwall |
| 4,398,553 | A | * | 8/1983 | Perrine ................ F16K 13/04 137/68.14 |
| 4,928,919 | A | * | 5/1990 | Daicho ................ F16K 1/302 251/278 |
| 6,007,045 | A | | 12/1999 | Heiniger et al. |
| 2011/0132471 | A1 | | 6/2011 | Rub et al. |
| 2012/0097880 | A1 | | 4/2012 | Boettcher et al. |
| 2014/0158923 | A1 | | 6/2014 | Wolpert et al. |
| 2015/0053875 | A1 | | 2/2015 | Fohn |

FOREIGN PATENT DOCUMENTS

| | | |
|---|---|---|
| DE | 102008045857 A1 | 3/2010 |
| DE | 102011080139 A1 | 1/2013 |
| EP | 0897076 A1 | 2/1999 |
| EP | 2843279 A2 | 3/2015 |
| JP | 2004324661 A | 11/2004 |

OTHER PUBLICATIONS

Official Report issued on Oct. 16, 2015 in European Application No. 15165691.5.

* cited by examiner

US 9,772,038 B2

INTERMEDIATE PIECE FOR A STOP VALVE

CROSS-REFERENCE TO RELATED APPLICATIONS

The present Application claims priority to and all the benefits of German Patent Application No. 102014210353.3, filed on Jun. 2, 2014, which is hereby expressly incorporated herein by reference in its entirety.

BACKGROUND OF THE INVENTION

1) Field of the Invention

The invention relates to an intermediate piece for a stop valve and in particular a membrane valve for fluids.

2) Description of the Related Art

Membrane valves, in which a membrane separates a drive area from a fluid-carrying area are well-known. For example, DE 10 2011 080 139 A1 discloses a membrane valve for fluid media. A connection piece can be activated by a drive system and designed to impinge the membrane. One area of the connection piece has catch pins to attach the connection piece to the drive system. The catch pins have an axial slot and are designed in the form of a hollow pin so that the catch pin has at least two axial fingers which have the radially protruding lug.

EP 0 897 076 A1 discloses a membrane valve in which a membrane holder can be mounted or exchanged, independent of the position of a pressure spindle. In the membrane holder a recess has been provided for coupling the pressure spindle with the membrane holder so that a free end of the pressure spindle can be laterally inserted in a groove in order to form a tongue and groove connection. Subsequently, by slipping over the pressure piece the radial displacement of the membrane holder is locked.

DE 10 2008 045 857 A1 discloses a membrane valve in which a membrane body, a sealing membrane and a connection piece are firmly connected to form a sealed valve body unit which can be connected to a drive system.

SUMMARY OF THE INVENTION

It is the object of the invention to simplify the process of exchanging a closure element for a stop valve. To this end, the present invention is directed toward an intermediate piece for a membrane-type stop valve for fluids wherein a pressure piece can be arranged in the intermediate piece and the pressure piece has at least two locking slides for locking a locking member of this closure element. The intermediate piece includes a cylinder in which the pressure piece can be guided in an axial manner. The intermediate piece further includes a recess which is arranged in such a way that in a mounting position of the pressure piece, the locking slides are shifted into the recess, thus releasing the locking member.

Because of the fact that the intermediate piece has a cylinder, in which a pressure piece can be axially guided with the locking slides, it is possible to provide in a simple manner a cost-effective intermediate piece which allows for exchanging a closure element. A recess in the intermediate piece is arranged in such a way that in mounting position of the pressure piece the locking slides are shifted to the recess, thus releasing the locking member. As a result, it is possible to axially remove the locking member from the pressure piece and to mount a new closure element together with the locking member to the pressure piece.

Advantageously, the mounting position of the pressure piece can be attained along the infeed axis. As a result, no further mechanical components are required. Instead, the drive system for the intermediate piece can be used to attain the mounting position.

Another advantage is provided for a membrane arranged at the closure element, which membrane is basically not tensioned in mounting position, thus improving the mounting of a new closure element.

BRIEF DESCRIPTION OF THE DRAWINGS

Subsequently, exemplary embodiments of the invention are explained with reference to the drawing. It is shown.

DETAILED DESCRIPTION OF THE INVENTION

Figure 1:
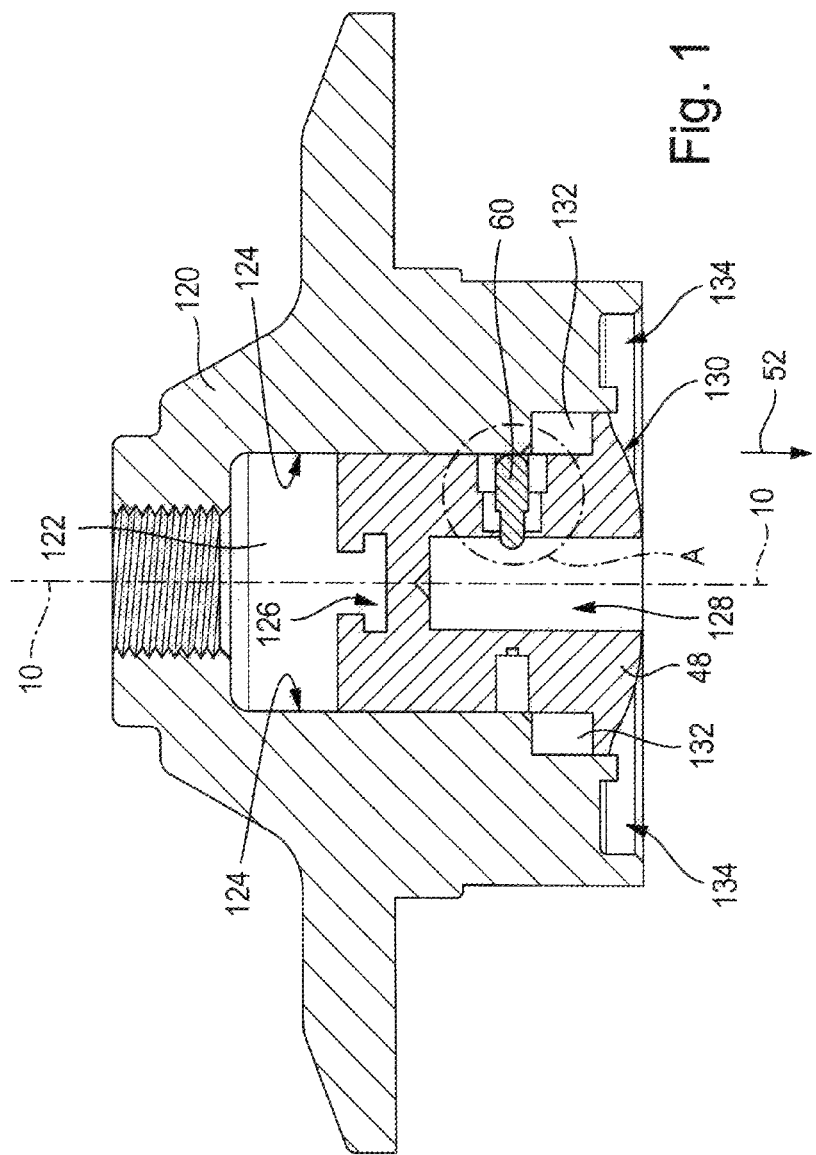
FIG. 1 a schematic sectional view of the intermediate piece of the present invention.

FIG. 1 shows a schematic sectional view of an intermediate piece 120 design to be disposed between a drive system and a valve body of a stop valve. The intermediate piece 120 includes a cylinder with internal surfaces 124 extending along an infeed axis 10.

It is possible to arrange a pressure piece 48 in the intermediate piece 120. With regard to its external contours, the pressure piece 48 is basically designed rotationally symmetric in relation to the infeed axis 10. A first recess 126 of the pressure piece has been provided to receive a driving rod. A second recess 128 is designed for receiving the locking member of a closure element subsequently described in FIGS. 3 and 4. A pressing portion 130 of the pressure piece 48 has been provided for pressing a membrane 4 against a valve seat in order to lock the stop valve.

Transverse to the infeed axis 10, the pressure piece 48 has multiple equally spaced connecting holes between the recess 128 and the exterior of the pressure piece 48, wherein the sectional view of FIG. 1 shows only one connecting hole. A locking slide 60 is arranged in the respective connecting hole, each of which has different internal diameters. FIG. 1 shows the locking slide in a locking position for the closure element (not shown in FIG. 1).

The pressure piece 48 can be guided in the cylinder 122 in axial manner along the infeed axis 10. Starting from the cylinder 122, the intermediate piece 120 includes a recess 132 in feeding direction 52, which is arranged in such a way that in a mounting position of the pressure piece 48 the locking slides 60 are shifted in the recess 132, thus releasing the locking member. The mounting position is attained by moving the pressure piece 48 in feeding direction. In FIG. 1 the pressure piece 48 is positioned in relation to the intermediate piece 120 in such a way that the interior wall of the cylinder 124 presses the locking slides 60 radially to the inside. If now the pressure piece 48 is moved in feeding direction 52 out of the position shown in FIG. 1 and to mounting position, the locking slides 60, which are impinged with a force acting radially to the outside, are moved in the recess 132 radially to the outside.

In FIG. 1 the position of the pressure piece 48 in relation to the intermediate piece 120 involves a locking position of the pressure piece 48. In this position, the pressure piece 48 presses by a membrane 4 in such a way on the valve seat that the stop valve is sealed. Following the locking position, the mounting position, which serves to release the closure element, occupies feeding direction 52. In mounting position the closure element can be removed from the pressure piece 48 and the intermediate piece 120, and a new closure element can be supplied to the pressure piece 48 or the intermediate piece 120 and sealed.

Furthermore, the intermediate piece 120 comprises a clamping range 134, which is designed to clamp the membrane between the intermediate piece 120 and the valve body. The recess 132 is located in a vertical plane of the infeed axis and is formed by a difference in diameter of the cylinder 122 opening in feeding direction 52.

Those having ordinary skill in the art will appreciate that the recess 132 and the pressure piece 48 can also be designed in a different manner than the one shown in FIG. 1. For example, the recess 132 can be designed in the form of an annular groove in the interior wall of the cylinder 122. For example, in this embodiment the pressure piece 48 can even be designed without the pressing portion that is enlarged in feeding direction 52 or the respective difference in diameter of the pressure piece 48.

In a different embodiment, the recess 132 can be formed by a hole in the interior wall of the cylinder 124, which hole is corresponding to the position of the respective locking slide 60, when the pressure piece 48 is guided in torque-proof manner in the cylinder 122, i.e., when the pressure piece 48 cannot or only to a limited extent be rotated about the infeed axis 10.

Figure 2:
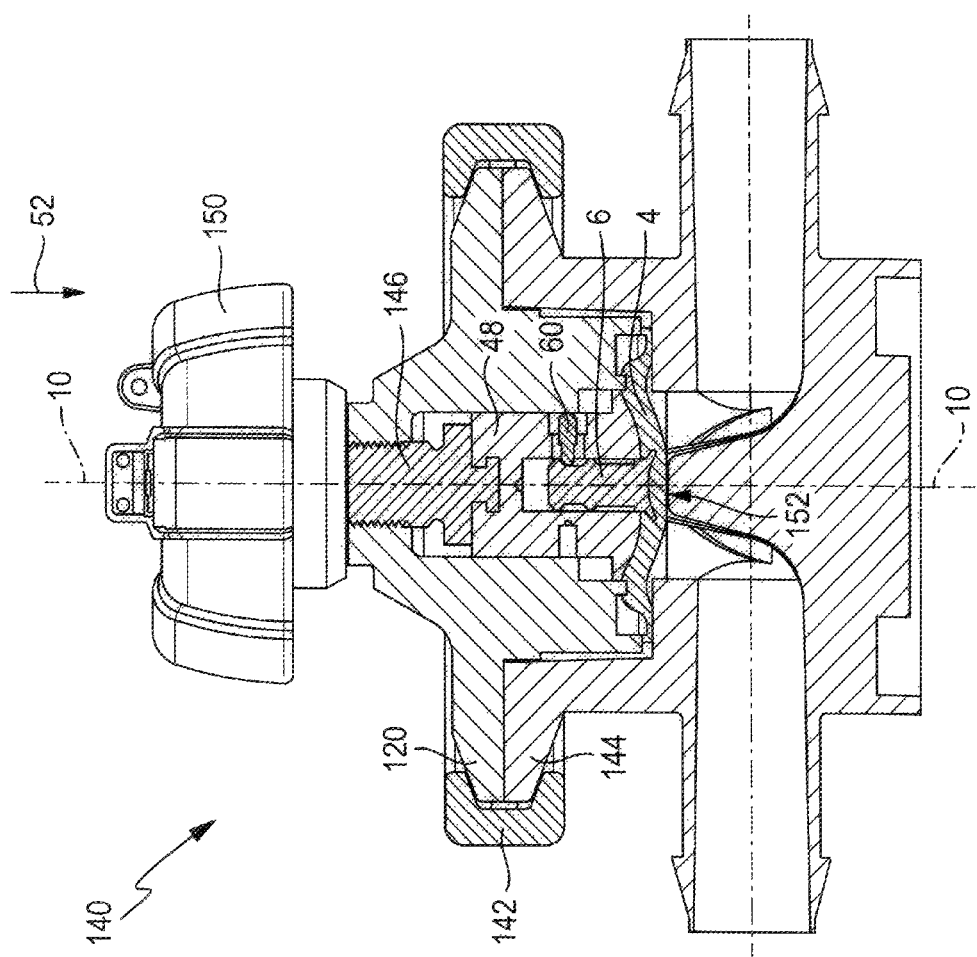
FIG. 2 a schematic lateral/sectional view of the stop valve of the present invention.

FIG. 2 shows a schematic lateral/sectional view of the stop valve 140. The intermediate piece 120 is connected with the valve body 144 of the intermediate piece 140 by a detachable clamping device 142. The pressure piece 48 can be moved along the infeed axis 10 via the driving rod 146 by a hand wheel 150. For this purpose, the driving rod 146 has an external thread which interacts with an internal thread of the intermediate piece 120. The drive system of the pressure piece 48 in the form of the driving rod 146 and the hand wheel 150 is only provided as an example and can certainly be substituted in particular by a pneumatic or electrical drive system.

FIG. 2 shows the stop valve 140 in closed position, in which the membrane 4 presses on a valve seat 152, thus locking the stop valve 140. In closed position, the locking slides 60 do not release the locking member 6. As a result, the closure element, which consists of the locking member 6 and the membrane 4, is always securely locked when the stop valve 140 is in operating condition.

Only when the intermediate piece 120 is removed from the valve body 144, the pressure piece 28 can be transferred to mounting position in order to release the locking member 6.

Figure 3:
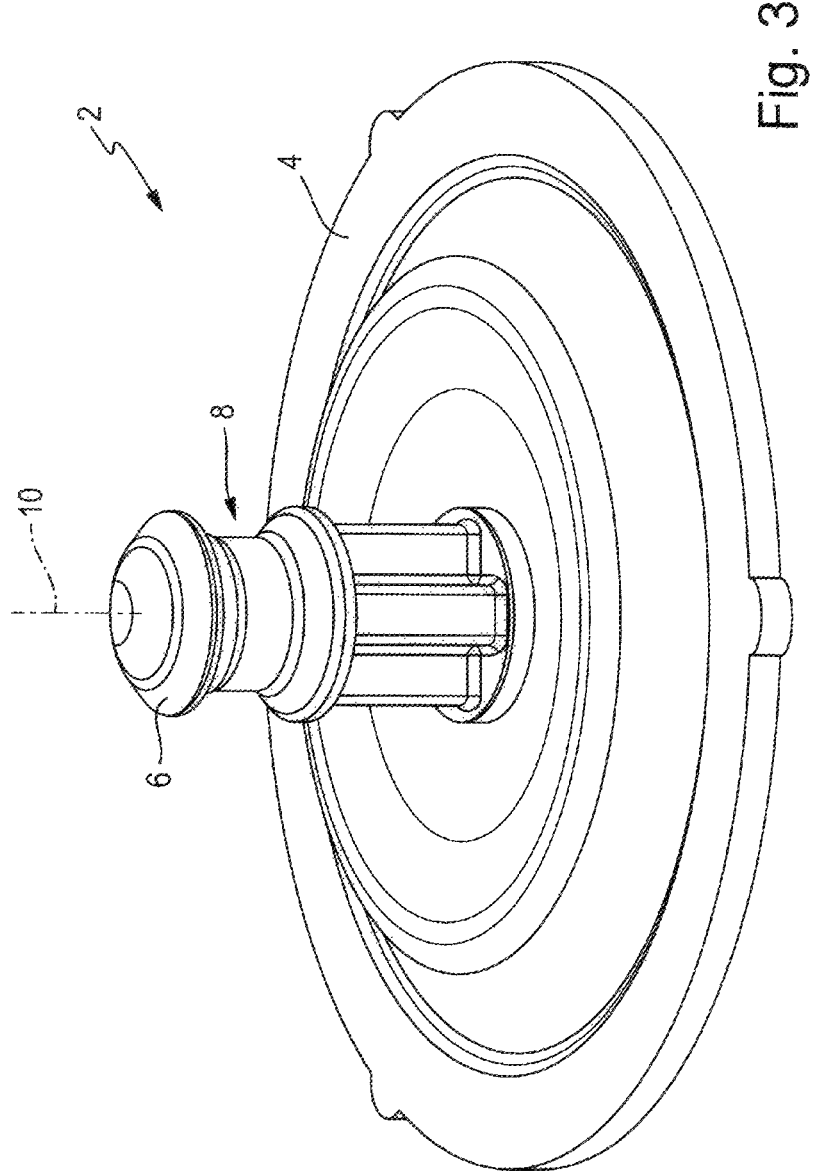
FIG. 3 a perspective view of the closure element of the present invention.

FIG. 3 shows a perspective view on the closure element 2 of the stop valve for fluids. The closure element 2 comprises the membrane 4 and the locking member 6 protruding from the membrane 4. The locking member 6 is arranged centrally in relation to the membrane 4. The locking member 6 has an external diameter return 8. The locking member 6 consists of a basically non-deformable material, for example, a metal, a metal alloy or a thermoplastic material. In particular, the locking member 6 is basically non-deformable when the stop valve reaches operating temperature. In contrast, the membrane 4 consists of a material that is basically deformable when the stop valve reaches operating temperature, in order to move the membrane 4 along the infeed axis 10. The membrane 4 is designed to interact with the valve body of the stop valve.

Figure 4:
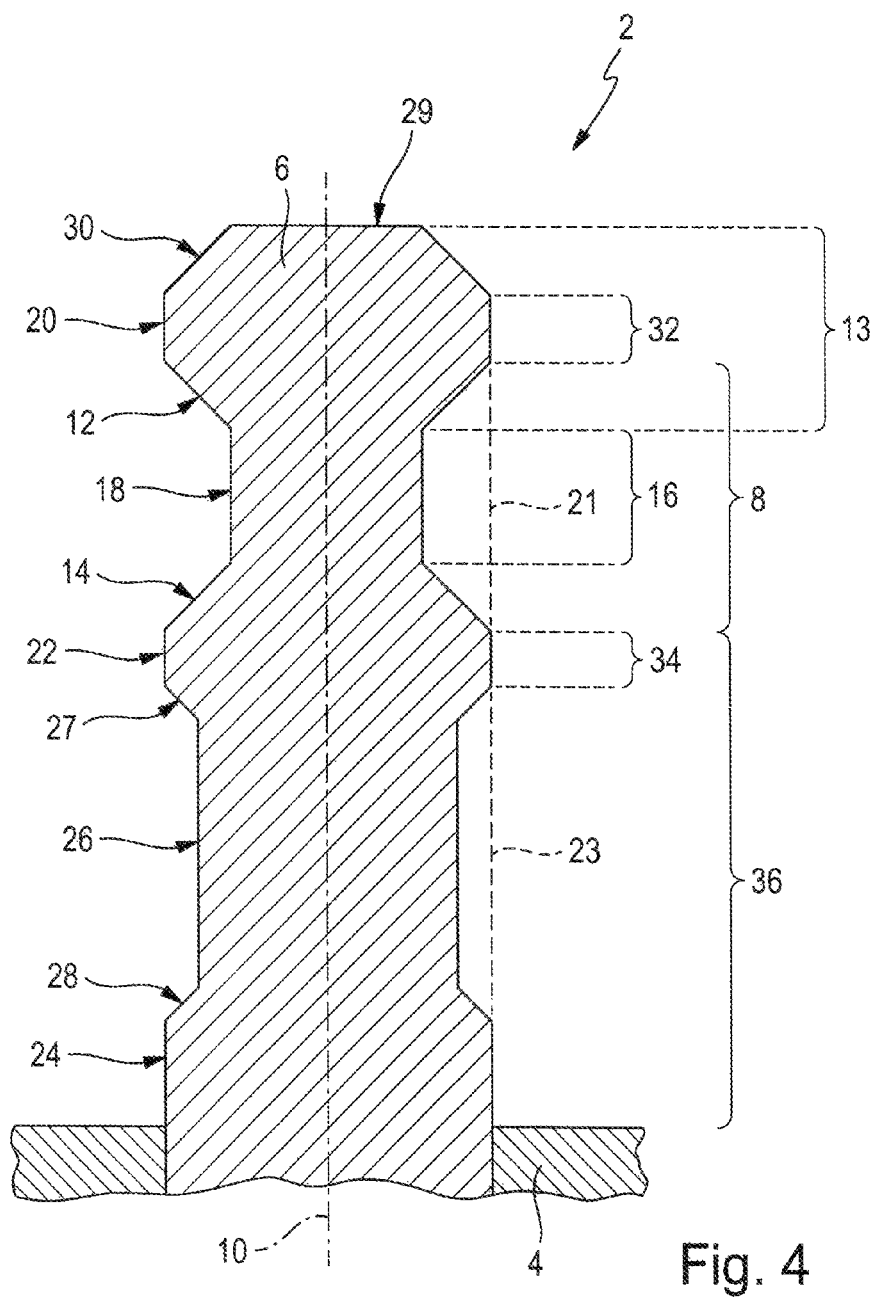
FIG. 4 a schematic sectional view of the closure element of the present invention.

FIG. 4 shows a schematic sectional view through a portion of the closure element 2, in particular through the protruding locking member 6. FIG. 4 shows also that the locking member 6 is arranged in the membrane 4, or sealed with the membrane 4. The external diameter return 8 has a first limit stop range 12 up to a distal end 13 of the locking member 6. The external diameter return 8 has a second limit stop range 14 up to the membrane 4. The limit stop ranges 12 and 14 are spaced over a distance 16. As a result they are spaced in such a way that in a locking condition the closure element 6 and the subsequently described pressure piece can be moved toward each other along the infeed axis 10. The limit stop ranges 12 and 14 of the external diameter return 8 of the locking member 6 correspond to external surfaces of the truncated cones moving toward each other.

The external diameter return 8 has an internal guidance range 18, which basically corresponds to a cylindrical outer surface aligned in parallel to the infeed axis 10. Furthermore, the closure element 10 is basically designed rotation-symmetrically in relation to the infeed axis 10. The locking slides 60 can be shifted to a locking position in which the locking slides engage the internal guidance range radially from the outside. As a result, the locking member 6 is centered by the locking slides, or supported along the infeed axis 10. As a result, the internal guidance range 18 is structured in such a way that in locking position the closure element 2 and the pressure piece are moved toward each other along the infeed axis 10. The external diameter return 8 is circumferentially, or along a perimeter, uninterrupted. As a result, the external diameter return 8 has been provided for receiving the locking slides 60 in their locking position. In the region of the distal end, the locking member 6 has a first external guidance range 20. Starting from the first external guidance range 20, a second external guidance range 22 adjoins the external diameter return 8 as far as the membrane 4. A third guidance range 24 adjoins a distance range 26 as far as the membrane 4. As indicated by the dotted lines 21 and 23, the external guidance ranges 20, 22 and 24 basically have the same diameter. In particular, the external diameter return 8 is arranged between the first guidance range 20 and the second guidance range 22. Basically, the external guidance ranges 20, 22 and 24 correspond to the cylindrical outer surfaces.

The distance range 26 is reduced in relation to the respective external surface of the external guidance ranges 22 and 24 by the external surfaces of the truncated cones 27 and 28 tapered to the respective distance range 26.

Furthermore, the distal end 13 has a connecting surface 29 and an inlet area 30. In feeding direction or parallel to the infeed axis 10, the external guidance ranges 20 and 22 basically have the same size and basically the respectively same height 32 and 34. The external diameter return 8 is spaced from the membrane 4 over a distance 36.

Figure 5:
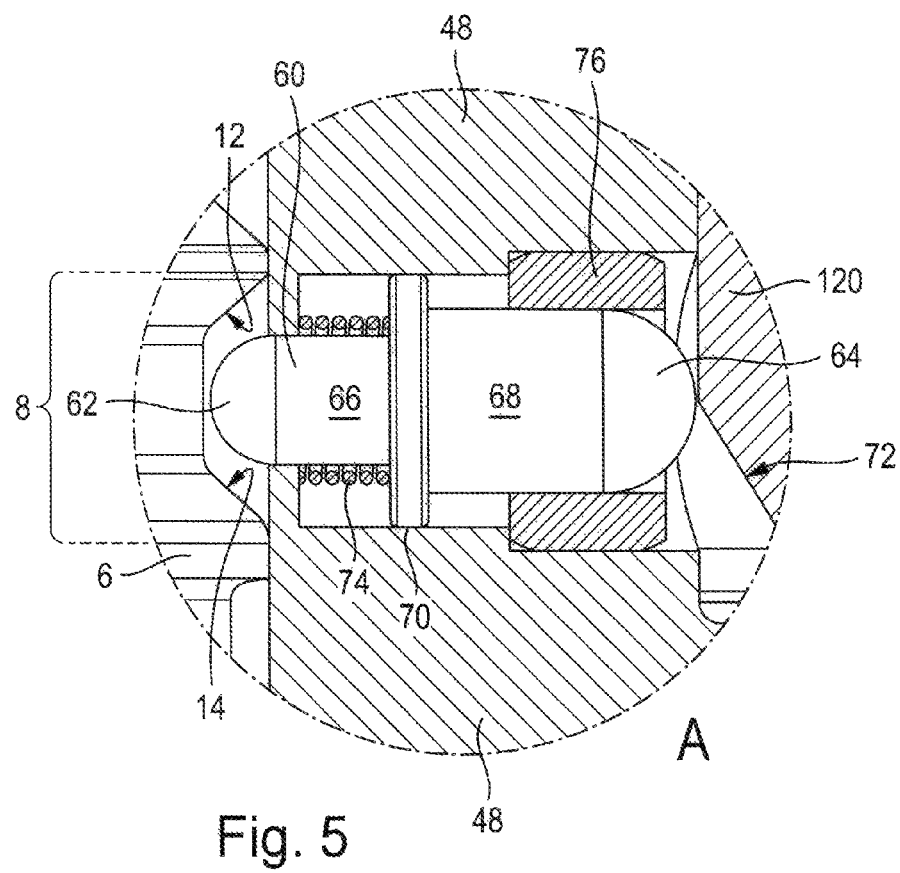
FIG. 5 a section A of FIG. 2 illustrating a closed locking member.

FIG. 5 shows section A of FIG. 1 with a closed locking member 6. The locking slide 60 occupies the locking position which seals the locking member. The locking slide 60 is received in the pressure piece 48 in such a way that the locking slide 60 can be moved basically orthogonal to the infeed axis 10. The locking slide 60 has a first rounded end 62 and a second rounded end 64. Each end 62 and 64 is adjoined by a respective cylindrical outer surface 66 and 68.

An annular external diameter projection 70 is located between the cylindrical outer surfaces 66 and 68. The limit stop range 12 of the locking member 6 has been provided for the first end 62 of the locking slide 60. An inlet area 72 of the cylinder 122 of the intermediate piece 120 has been provided for the second end 64 of the locking slide 60. Basically, the inlet area 72 corresponds to an internal surface of the truncated cone tapered opposite to the feeding direction 52. The inlet area 72 is part of the recess 132.

The locking slide 60 is permanently mounted orthogonally to the infeed axis 10. A spring element 74 is arranged between the pressure piece 48 and the annular external diameter projection 70 in such a way that the locking slide 60 is always impinged with a force which acts radially to the outside in relation to the infeed axis 10 in order to shift the locking slide 60 to an unlocking position when the second end 64 is released. Orthogonally to the infeed axis 10, the locking slide 60 is larger than a wall thickness of the pressure piece 48 in the area of the locking slide 60. The locking slide 60 is permanently mounted in the pressure piece 48 by a circular body tightly pressed into the pressure piece 48. The external diameter return 8 of the locking slide 6 is designed in such a way that the closure element 2 can be locked by the locking slides 60 which can be supplied basically orthogonally to the infeed axis 10.

Figure 6:
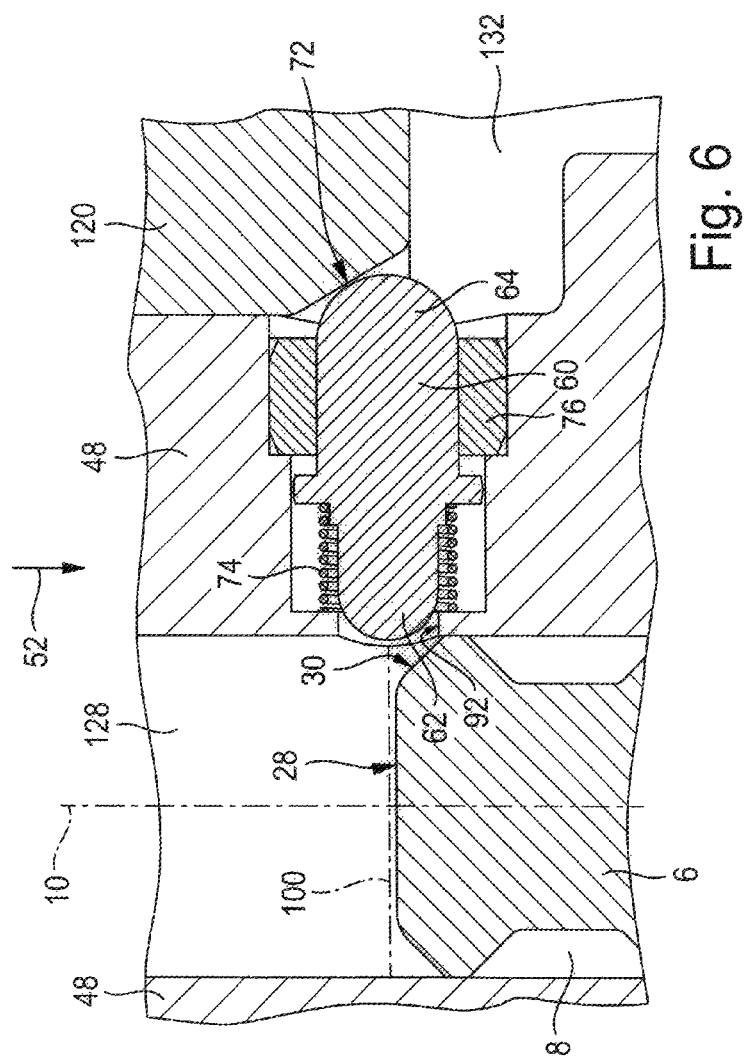
FIG. 6 a schematic sectional view involving a mounting step for the closure element.

FIG. 6 shows a schematic sectional view of a portion of the stop valve 140 in a mounting step, wherein the pressure piece 48 is already in mounting position in relation to the intermediate piece 120. The locking member 6 is released, which results in the fact that the closure element can be removed in feeding direction 52. The distal end 13 comprises the truncated cone-shaped inlet area 30 which in a preferred embodiment is not touched by the locking slide 60 during the process of mounting and operating. For this purpose, the distal end 13 in the region of the inlet area 30 does not have a cylindrical shape but the shape of a truncated cone. This results in a recess which leaves a space for the first end 62 of the locking slide 60. The intermediate piece 120 comprises the inlet area 72 which releases a space for the second end 64 of the locking slide. A support for the locking slide 60 is designed in such a way that the locking slide 60 can be moved along the displacement axis 100.

During the mounting process, in the mounting step shown in FIG. 6, the pressure piece 48 occupies the mounting position in relation to the intermediate piece 120. The mounting position can be achieved only after the intermediate piece 120 has been removed from the valve body 144. Accordingly, the membrane 4 is no longer clamped between the intermediate piece 120 and the valve body 144. In the mounting step shown in FIG. 6, the pressure piece 48 is moved in feeding direction 52 beyond the locking position of the pressure piece 48 and to the mounting position. Because of the fact that the spring element 64 presses the locking slide 60 radially to the outside in relation to the infeed axis 10, in the position shown the second end 64 presses on the inlet area 72. At the same time, the first end 62 of the locking slide 60 is pushed into the opening 92. During a further movement of the pressure piece 48 in feeding direction 52, the locking slide 60 is pushed further into the recess 132.

As a result, the distal end 13 of the locking member 6, the intermediate piece 120 and a support for the locking slide 60 are adjusted to each other in such a way that, when the intermediate piece 120 is removed from the valve body 144 and the pressure piece 48 occupies the mounting position, the locking slide 60 retracts from the recess 128 and at the same time, and/or subsequently, is pushed into the recess 132.

When mounting a new closure element, the pressure piece is moved by the drive system to mounting position. Subsequently, in the event that a closure element 2 has to be exchanged, the old closure element 2 is removed. The new closure element 2 with its locking member is inserted into the recess 128 of the pressure piece 48. Subsequently, the pressure piece 48 is moved by the driving rod 146 to a position opposite to feeding direction in which the displacement taxis 100 is located in the region of the external diameter return 8 of the locking member 6. As a result, the locking slides 60 are shifted to the locking position which engages in the external diameter return 8.

The invention claimed is:

1. An intermediate piece for a membrane valve for fluids, comprising a pressure piece that acts to press a membrane against a valve seat in order to close the membrane valve, and wherein the pressure piece is arranged in the intermediate piece and the pressure piece has at least two locking slides for locking a locking member of a closure element protruding from the membrane, the intermediate piece further including a cylinder in which the pressure piece can be guided in axial manner, and a recess which is arranged in such a way that in a mounting position of the pressure piece the locking slides are shifted into the recess, thus releasing the locking member.

2. The intermediate piece as set forth in claim 1, wherein the mounting position of the pressure piece is located along an infeed axis.

3. The intermediate piece as set forth in claim 1, wherein the mounting position of the pressure piece is farther from a drive along a feeding direction than when the pressure piece is in a locking position.

4. The intermediate piece as set forth in claim 1, wherein the closure element can be removed in the mounting position from the pressure piece and the intermediate piece.

5. The intermediate piece as set forth in claim 1, wherein the recess is arranged and configured in such a way that the pressure piece can be transferred to the mounting position only when the intermediate piece is not attached to an associated valve body for an operation of a stop valve.

6. The intermediate piece as set forth in claim 1, wherein the recess is arranged and configured in such a way that in an operating condition of the stop valve the locking slides cannot be shifted into the recess and, consequently, cannot be shifted to an unlocked position which would release the locking member.

7. The intermediate piece as set forth in claim 1, wherein the recess is located in a perpendicular plane of an infeed axis.

8. The intermediate piece as set forth in claim 1, wherein the recess involves an annular groove in a cylinder wall of the cylinder.

9. The intermediate piece as set forth in claim 1, wherein the recess is provided by a diameter opening shift in a feeding direction.

10. The intermediate piece as set forth in claim 1, wherein the cylinder comprises a cylinder wall, by which the locking slides can be shifted to a locking position in which the locking slides grip the locking member of the closure element.

11. A stop valve including the intermediate piece as set forth in claim 1, the stop valve further including a drive system for the pressure piece wherein the drive system includes a hand wheel.

* * * * *

UNITED STATES PATENT AND TRADEMARK OFFICE
CERTIFICATE OF CORRECTION

PATENT NO. : 9,772,038 B2
APPLICATION NO. : 14/726784
DATED : September 26, 2017
INVENTOR(S) : Jochen Steigert et al.

Page 1 of 1

It is certified that error appears in the above-identified patent and that said Letters Patent is hereby corrected as shown below:

Item (73) Assignee: delete "GEMÜ Gebr. Müller Apparatebau GmbH & Co., Kommanditgesellschaft," and insert therefor --GEMÜ Gebr. Müller Apparatebau GmbH & Co. Kommanditgesellschaft,--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*